US012243512B2

(12) United States Patent
Sekine

(10) Patent No.: US 12,243,512 B2
(45) Date of Patent: Mar. 4, 2025

(54) ERRONEOUS CONVERSION DICTIONARY CREATION SYSTEM

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 17/042,192

(22) PCT Filed: Feb. 10, 2020

(86) PCT No.: PCT/JP2020/005198
§ 371 (c)(1),
(2) Date: Nov. 12, 2020

(87) PCT Pub. No.: WO2020/225949
PCT Pub. Date: Nov. 12, 2020

(65) Prior Publication Data
US 2021/0225361 A1 Jul. 22, 2021

(30) Foreign Application Priority Data
May 8, 2019 (JP) .................................. 2019-088361

(51) Int. Cl.
*G10L 15/00* (2013.01)
*G10L 13/08* (2013.01)
(Continued)

(52) U.S. Cl.
CPC ............ *G10L 15/063* (2013.01); *G10L 13/08* (2013.01); *G10L 2015/0631* (2013.01); *G10L 2015/088* (2013.01)

(58) Field of Classification Search
CPC .............. G10L 15/063; G10L 13/08; G10L 2015/0631; G10L 2015/088; G10L 15/20; G10L 15/06; G06F 40/40
See application file for complete search history.

(56) References Cited

U.S. PATENT DOCUMENTS

2007/0033026 A1* 2/2007 Bartosik ................. G10L 15/22
704/E15.04
2011/0131038 A1* 6/2011 Oyaizu .................... G10L 15/06
704/10
(Continued)

FOREIGN PATENT DOCUMENTS

CN 1764944 A 4/2006
CN 101266792 A 9/2008
(Continued)

OTHER PUBLICATIONS

Office Action of Canadian Application No. 3,105,967 dated Mar. 5, 2021 (4 pages).
(Continued)

*Primary Examiner* — Douglas Godbold
*Assistant Examiner* — Parker Mayfield
(74) *Attorney, Agent, or Firm* — Pyprus Pte Ltd; George D. Liu

(57) ABSTRACT

An incorrect conversion dictionary generating system includes a term input unit, a voice conversion unit 5 that converts an input term to voice to obtain input-term voice, a voice analysis unit that receives the input-term voice output from the voice conversion unit, performs a voice analysis to convert the input-term voice to a term, and obtains a voice analyzed term, and an incorrectly converted term determining unit that receives the input term from the term input unit or the voice conversion unit, receives the voice analyzed term from the voice analysis unit, and determines the voice analyzed term as an incorrectly con-
(Continued)

verted term of the input term when the input term does not match the voice analyzed term. The incorrect conversion dictionary generating system receives the input term and the incorrectly converted term, associates the input term with the incorrectly converted term, and stores in an incorrect conversion dictionary.

4 Claims, 3 Drawing Sheets

(51) Int. Cl.
*G10L 15/06* (2013.01)
*G10L 15/08* (2006.01)

(56) References Cited

U.S. PATENT DOCUMENTS

| | | | |
|---|---|---|---|
| 2012/0304057 A1* | 11/2012 | Labsky | G10L 13/00 |
| | | | 715/256 |
| 2014/0257815 A1 | 9/2014 | Zhao et al. | |
| 2017/0069317 A1 | 3/2017 | Kwon | |
| 2019/0043482 A1* | 2/2019 | Li | G10L 15/02 |

FOREIGN PATENT DOCUMENTS

| | | |
|---|---|---|
| CN | 103021412 A | 4/2013 |
| CN | 105027198 A | 11/2015 |
| CN | 105244029 A | 1/2016 |
| JP | 2001-34288 A | 2/2001 |
| JP | 2001-83989 A | 3/2001 |
| JP | 2002-140088 A | 5/2002 |
| JP | 2004-117771 A | 4/2004 |
| JP | 2008-216341 A | 9/2008 |
| JP | 4852448 B2 | 1/2012 |

OTHER PUBLICATIONS

International Search Report of International Patent Application No. PCT/JP2020/005198 completed May 11, 2020 and mailed May 19, 2020 (5 pages).
Written Opinion of International Patent Application No. PCT/JP2020/005198 completed May 11, 2020 and mailed May 19, 2020 (3 pages).
Office Action of Chinese Patent Application No. 202080002032.9 dated Mar. 5, 2021 (8 pages).
Written Opinion of Singapore patent application No. 11202011297W dated Aug. 10, 2022 (7 pages).

* cited by examiner

ERRONEOUS CONVERSION DICTIONARY CREATION SYSTEM

TECHNICAL FIELD

This invention relates to an incorrect conversion dictionary generating system.

BACKGROUND ART

Japanese Patent No. 4852448 discloses an error-tendency-learning voice recognition device. This error-tendency-learning voice recognition device performs various calculations using an error correction model, which is defined by a feature function representing an error tendency of a correct candidate and its weight, to learn an error tendency.

Patent Document 1: Japanese Patent No. 4852448

DISCLOSURE OF THE INVENTION

Problems to be Solved by the Invention

The error-tendency-learning voice recognition device disclosed in Japanese Patent No. 4852448 needs to perform various calculations in order to grasp an error tendency. This causes a problem of making a process complicated.

An object of an invention described in this description is to provide a system that can quickly and easily generate an appropriate incorrectly converted dictionary and a voice recognition system using the incorrectly converted term dictionary.

Solutions to the Problems

One of the inventions disclosed in this description inputs a term to a system and converts it to voice information to perform a voice analysis on the converted voice information. Then, the system stores the term obtained by the voice analysis as an incorrectly converted term of the input term when the term obtained by the voice analysis does not match the input term.

One of the inventions disclosed in this description relates to an incorrect conversion dictionary generating system 1. This system includes:
  a term input unit 3 to which a term is input;
  a voice data conversion unit 5 that converts an input term to voice data to obtain input-term voice data, the input term being a term input to the term input unit;
  a voice data analysis unit 7 that receives the input-term voice data output from the voice data conversion unit, performs a voice analysis to convert the input-term voice data to a term, and obtains a voice analyzed term; and
  an incorrectly converted term determining unit 9 that receives the input term from the term input unit or the voice data conversion unit, receives the voice analyzed term from the voice data analysis unit, and determines the voice analyzed term as an incorrectly converted term of the input term when the input term does not match the voice analyzed term.

The incorrect conversion dictionary generating system receives the input term and the incorrectly converted term thereof from the incorrectly converted term determining unit, associates the input term with the incorrectly converted term thereof, and stores in an incorrect conversion dictionary 11.

In a preferred example of this incorrect conversion dictionary generating system,
  the term input unit includes:
    an electronic file receiving unit that receives an electronic file; and
    a term extraction unit that extracts a term included in the electronic file received by the electronic file receiving unit.

One of the inventions described in this description is a voice recognition system including the above-described incorrect conversion dictionary generating system and relates to the system that includes:
  a voice receiving unit that receives a voice;
  a voice analysis unit that performs a voice analysis on the voice received by the voice receiving unit to obtain an analyzed term;
  an incorrectly converted term determining unit that determines whether the analyzed term matches any of incorrectly converted terms stored in the incorrect conversion dictionary; and
  a corrected-term-candidate extraction unit that obtains an input term corresponding to the matching incorrectly converted term as a candidate of a correct term when the incorrectly converted term determining unit determines that the analyzed term matches any of the incorrectly converted terms stored in the incorrect conversion dictionary.

Effects of the Invention

With this invention, the appropriate incorrectly converted dictionary can be quickly and easily generated. Then, using such an appropriate incorrectly converted dictionary can easily improve the accuracy of the voice recognition.

DESCRIPTION OF PREFERRED EMBODIMENTS

The following describes an embodiment of the present invention using the drawings. The present invention is not limited to the embodiment described below and includes ones appropriately modified in an obvious range by those skilled in the art from the following embodiment.

Figure 1:
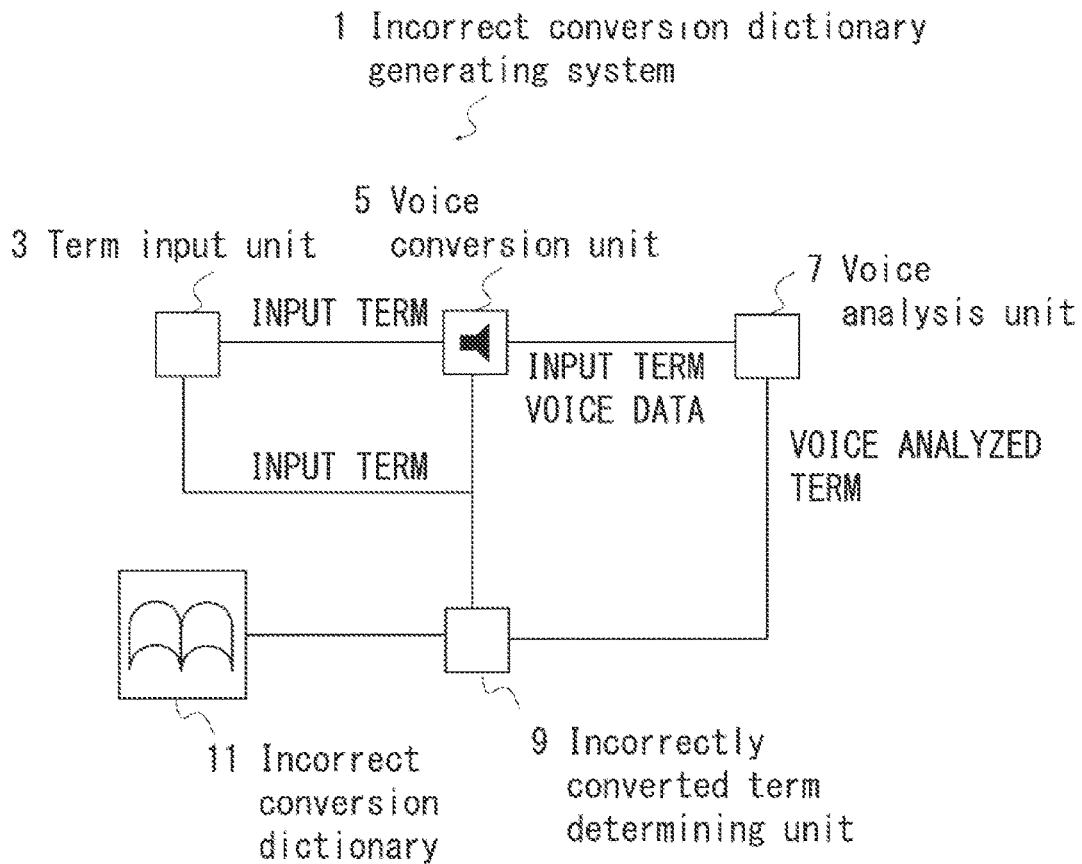
FIG. 1 is a conceptual diagram illustrating a basic configuration example of an incorrect conversion dictionary generating system.

FIG. 1 is a conceptual diagram illustrating a basic configuration example of an incorrect conversion dictionary generating system. As illustrated in FIG. 1, an incorrect conversion dictionary generating system 1 includes a term input unit 3, a voice data conversion unit 5, a voice data analysis unit 7, an incorrectly converted term determining unit 9, and an incorrect conversion dictionary 11. This system is basically implemented by a computer (and software). It is preferred that this system is a system where a process is automatically performed by the computer. Further, when an input from a user is performed, this system may be configured to process even the input as one piece of information. Respective elements and elements expressed by units in this description function as means that performs various processes in the computer.

Figure 2:
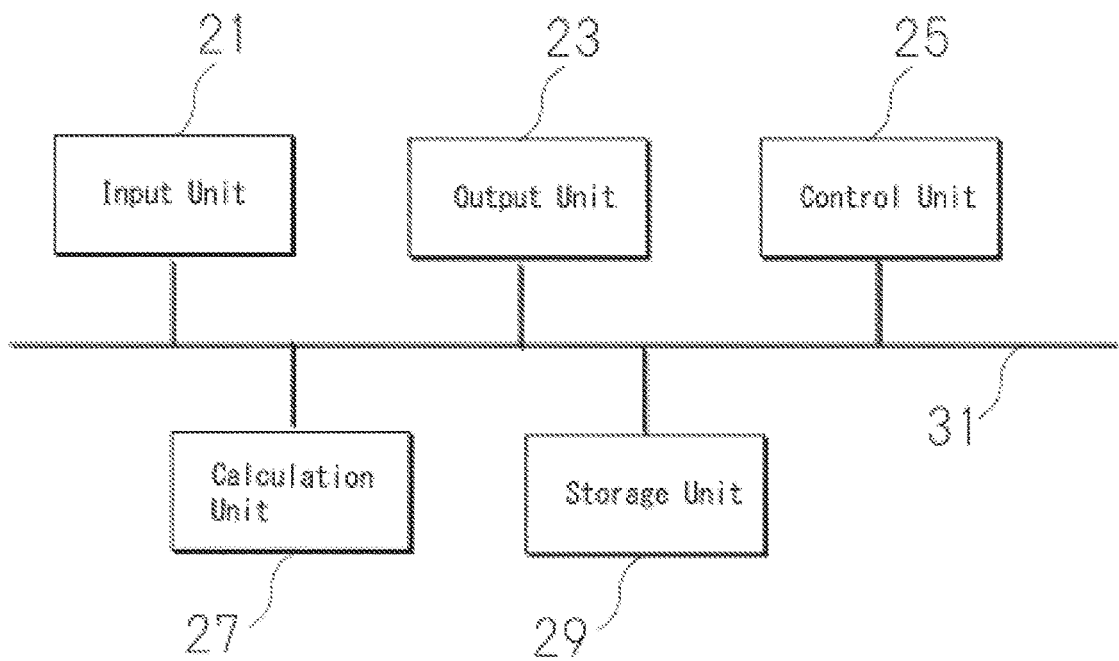
FIG. 2 is a block diagram illustrating a basic configuration of a computer.

FIG. 2 is a block diagram illustrating a basic configuration of the computer. As illustrated in this diagram, the computer includes an input unit 21, an output unit 23, a control unit 25, a calculation unit 27, and a storage unit 29, and the respective elements are coupled by a bus 31 or the like and can transmit and receive information. For example, the storage unit may store a control program and may store various information. When predetermined information is input from the input unit, the control unit reads the control program stored in the storage unit. Then, the control unit appropriately reads the information stored in the storage unit and transmits it to the calculation unit. Further, the control unit appropriately transmits the input information to the calculation unit. The calculation unit performs arithmetic processing using the received various information and stores in the storage unit. The control unit reads the arithmetic operation result stored in the storage unit and outputs it from the output unit. Thus, the various processes are performed. These various processes are executed by the respective means.

The incorrect conversion dictionary generating system 1 is a system for generating an incorrect conversion dictionary. The incorrect conversion dictionary is a list of terms included in a term group and incorrectly converted terms possibly incorrectly converted when a voice of the term is recognized. The incorrect conversion dictionary is an electronic dictionary (storage unit) that is used in the computer. For example, the appropriate incorrectly converted dictionary is used such that, when a voice analysis of a conversation is performed, the incorrect conversion dictionary corresponding to the conversation is read, and a term on which the voice analysis is performed is converted to its related (correct) term or a correct term is read as a correction term candidate when it is an incorrectly converted term. This appropriate incorrectly converted dictionary may be a dictionary of, for example, a presentation, (an attached document of) a disease, a document of news, a document to be interpreted, a book to be recited, or a technical field.

The term input unit 3 is an element for inputting a term to the system. The term input unit 3 may be a pointing device, such as a keyboard. For example, the user types "diabetes" using the keyboard. Then, the keyboard inputs information relating to the term "diabetes" to the system. Thus, the term is input to the system.

The voice data conversion unit 5 is an element for converting the input term (example: "TO" "U" "NYO" "BYO" (which means "diabetes" in phonogramic hiragana characters in this case)), which is the term input to the term input unit 3, to voice data to obtain input-term voice data (example: "TO" "U" "NYO" "BYO" expressed by frequency data). The voice data is data that is converted to audible voices (frequency data) that human can hear when it is output from an output device, such as a speaker. For example, a voice data conversion device outputs the term input with a keyboard as voices from a speaker. As this voice data conversion unit 5, a known voice data conversion device may be appropriately used. Note that, the voice data conversion unit 5 may actually output it as voices (as audible by human) from an output device, such as a speaker. Further, the voice data conversion unit 5 converts the input term to voice data that can be processed by the computer, and does not have to actually output the voices. Note that, in this case, it is preferred that the voice data is, for example, data in the state where human can hear via the speaker. Further, purposely, the incorrect conversion dictionary generating system 1 may be placed under a noise environment to output the voices from the speaker in this state. Doing so can reproduce a voice recognition situation under an actual conversation environment. Examples under the noise environment are an academic conference, a lecture, outside, a hospital, a company, and a construction site. Note that, this incorrect conversion dictionary generating system may include a noise output unit that outputs noise data under these noise environments to configure the voice data using data where the input term and the noise data are combined when the voice data conversion unit 5 converts the input term to the voice data. In this method, actually, the noise may be output from the speaker, and the output input term may be output from the speaker to converted it to the voice data. Further, the voice data based on the input term and the noise data may be mixed to generate input-term voice data.

The voice data analysis unit 7 is an element for receiving the input-term voice data (example: "TO" "U" "NYO" "BYO" expressed by frequency data) from the voice data conversion unit 5 and performing a voice analysis to convert the input-term voice data to a term, thus obtaining a voice analyzed term (example: "bean, milk, tack" (which are incorrectly converted terms))). The voice data analysis unit 7 converts, for example, the input voice (vibration information) to the input-term voice data, which is electronic data including a frequency, to analyze the electronic data including the frequency, thus converting it to a term. Thus, the voice data analysis unit 7 can obtain the voice analyzed term (example: "bean, milk, tack"). A voice conversion device that converts voice data to a term is known. Therefore, as the voice data analysis unit 7, a device including a known voice conversion algorithm can be appropriately used.

The incorrectly converted term determining unit 9 is an element for determining the voice analyzed term as an incorrectly converted term of the input term when the input term does not match the voice analyzed term.

The incorrectly converted term determining unit 9 receives the input term (example: "diabetes") from the term input unit 3 or the voice data conversion unit 5. Meanwhile, the incorrectly converted term determining unit 9 receives the voice analyzed term (example: "bean, milk, tack") from the voice data analysis unit 7. Then, the incorrectly converted term determining unit 9 determines whether the input term (example: "diabetes") match the voice analyzed term (example: "bean, milk, tack") or not. Then, when the input term does not match the voice analyzed term, the voice analyzed term (example: "bean, milk, tack") is determined to be an incorrectly converted term of the input term ("diabetes"). The obtained voice analyzed term (example: "bean, milk, tack") is appropriately stored as the incorrectly converted term of the corresponding input term ("diabetes") in the incorrect conversion dictionary 11.

Figure 3:
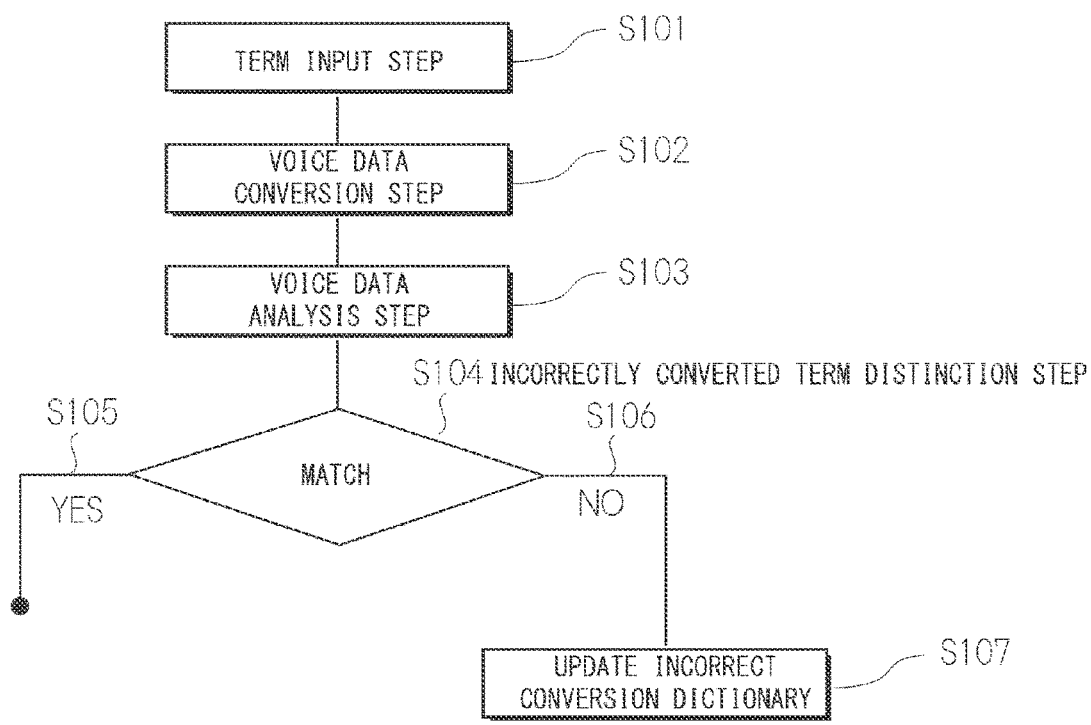
FIG. 3 is a flowchart illustrating a basic operation example of the incorrect conversion dictionary generating system.

FIG. 3 is a flowchart illustrating a basic operation example of the incorrect conversion dictionary generating system.

For example, a presentation file (such as, a presentation file generated using PowerPoint® including a plurality of terms is dragged and dropped to a voice recognition application. Then, the incorrect conversion dictionary generating system analyzes the term included in the presentation file, and the term (example: "diabetes") included in the presentation file is input to the incorrect conversion dictionary generating system 1 (term input step: S101). The data of, for example, the input term is appropriately stored in the storage unit and is read from the storage unit as necessary to be used for various arithmetic processing.

The term (example: "diabetes") input to the incorrect conversion dictionary generating system 1 is converted to the input-term voice data (example: "TO" "U" "NYO" "BYO;" example: frequency data) (voice data conversion step: S102). The obtained input-term voice data is appropriately stored in the storage unit and is read from the storage unit as necessary to be used for the various arithmetic processing.

The incorrect conversion dictionary generating system 1 receives the input-term voice data (example: "TO" "U" "NYO" "BYO") and performs the voice analysis to convert the input-term voice data to the term, thus obtaining the voice analyzed term (example: "bean, milk, tack") (voice data analysis step: S103). At the voice analysis, a known algorithm may be appropriately used. The obtained voice analyzed term is appropriately stored in the storage unit and is read from the storage unit as necessary to be used for the various arithmetic processing.

The incorrect conversion dictionary generating system 1 receives the input term and the voice analyzed term (these may be read from the storage unit) to determine whether the input term matches the voice analyzed term or not (incorrectly converted term distinction step: S104).

When the input term matches the voice analyzed term (S105), the incorrect conversion dictionary 11 does not have to be updated.

When the input term does not match the voice analyzed term (S106), the voice analyzed term (example: "bean, milk, tack") is determined to be the incorrectly converted term of the input term ("diabetes").

The obtained voice analyzed term (example: "bean, milk, tack") is appropriately stored as the incorrectly converted term of the corresponding input term ("diabetes") in the incorrect conversion dictionary 11. Thus, the incorrect conversion dictionary 11 is updated (incorrect conversion dictionary update step: S107).

Figure 4:
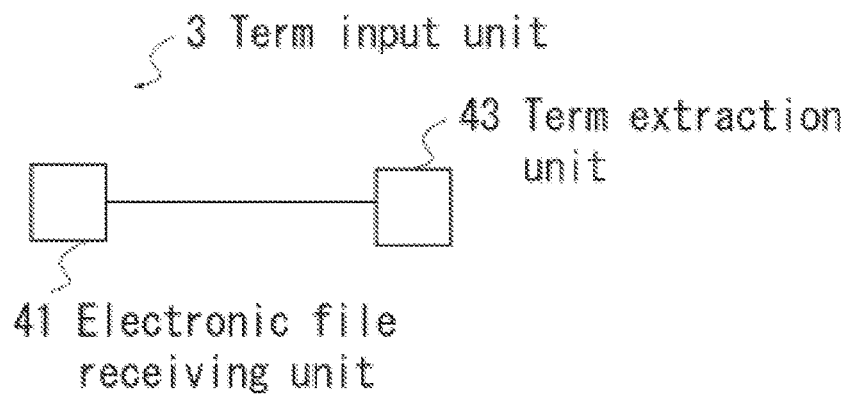
FIG. 4 is a conceptual diagram for describing an example of a term input unit.

FIG. 4 is a conceptual diagram for describing an example of the term input unit. This term input unit 3 includes an electronic file receiving unit 41 and a term extraction unit 43. Then, the electronic file receiving unit 41 receives an electronic file, and the term extraction unit 43 extracts a term included in the received electronic file. The extracted term is input as the input term to the system. The examples of the electronic files may be a document, such as Word®, may be electronic data of the original of a comic book, may be a scenario and a script, and may be a presentation material, such as PowerPoint®. The terms included in them can be easily extracted in an electronic state. Then, each of the terms is input to the system as input terms.

For example, when terms of news are converted, the terms may be extracted from a script of the news. Further, websites may be automatically searched using a topic term relating to the news, terms included in the website that has come up may be extracted, and they may be determined as input terms. Doing this can prepare an incorrectly converted term quickly when news is reported.

For example, when an MR gives a presentation, the system may receive a presentation material to automatically extract terms included in the presentation material. Further, when the presentation material includes a specific medicine name or disease name, a material regarding the medicine, such as an attached document regarding the medicine, may be automatically read from the storage unit to extract terms included in the attached document and the like. Further, when there is an incorrect conversion dictionary regarding the medicine, a list of terms corresponding to incorrectly converted terms, which is included in the incorrect conversion dictionary, may be automatically read. The same applies to the disease name.

This description also provides a computer-readable program for causing the computer to function as the above-described incorrect conversion dictionary generating system and an information recording medium (such as CD-ROM) storing the program.

The program causes, for example, the computer to function as:

term input means to which a term is input;

voice data conversion means that converts an input term to voice data to obtain input-term voice data, the input term being a term input to the term input means;

voice data analysis means that receives the input-term voice data output from the voice data conversion means, performs a voice analysis to convert the input-term voice data to a term, and obtains a voice analyzed term;

incorrectly converted term determining means that receives the input term from the term input means or the voice data conversion means, receives the voice analyzed term from the voice data analysis means, and determines the voice analyzed term as an incorrectly converted term of the input term when the input term does not match the voice analyzed term; and the incorrect conversion dictionary generating system that receives the input term and the incorrectly converted term thereof from the incorrectly converted term determining means, associates the input term with the incorrectly converted term thereof, and stores in an incorrect conversion dictionary.

The term input means may include:

electronic file receiving means that receives an electronic file; and term extraction means that extracts a term included in the electronic file received by the electronic file receiving means.

Next, a voice recognition system 51 will be described.

Figure 5:
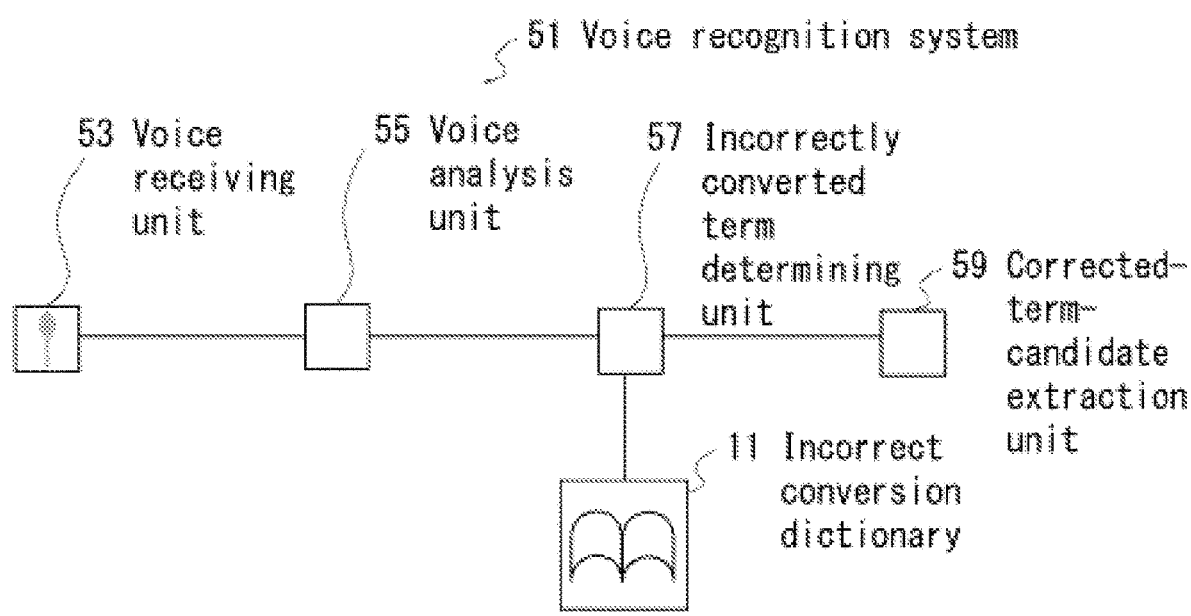
FIG. 5 is a conceptual diagram for describing a voice recognition system.

FIG. 5 is a conceptual diagram for describing the voice recognition system. As illustrated in FIG. 5, this voice recognition system 51 includes the incorrect conversion dictionary 11, a voice receiving unit 53, a voice analysis unit 55, an incorrectly converted term determining unit 57, and a corrected-term-candidate extraction unit 59. This system may include the incorrect conversion dictionary generating system previously described. Further, it may include the incorrect conversion dictionary 11 that is updated by the above-described incorrect conversion dictionary generating system.

The voice recognition system 51 is a system that converts voice information to character information. A voice recognition device that converts voice information to character information is known. Therefore, for the voice recognition system 51, an element of a known voice recognition device may be appropriately employed.

The voice receiving unit 53 is an element for receiving a voice. An example of the voice receiving unit 53 is a microphone. The microphone converts the received frequency information (vibration information) to an electrical signal that can be processed by the computer.

The voice analysis unit 55 is an element for receiving the voice information (electrical signal) from the voice receiving unit 53 to analyze it. This analysis algorithm is known. For example, the voice analysis unit 55 analyzes the frequency included in the electrical signal based on the voice received by the voice receiving unit. Then, the voice analysis unit 55 obtains an analyzed term.

The incorrectly converted term determining unit 57 is an element for determining whether the analyzed term matches any of the incorrectly converted terms stored in the incorrect conversion dictionary 11. As described above, when the analyzed term is obtained, the computer reads the incorrectly converted terms stored in the incorrect conversion dictionary 11. Then, the computer determines whether the read incorrectly converted terms and the analyzed term match or not.

When the analyzed term matches a read incorrectly converted term, the corrected-term-candidate extraction unit 59 reads the input term corresponding to the incorrectly converted term from the incorrect conversion dictionary 11 as a candidate of a correct term. Thus, the candidate of the correct term is obtained.

For example, when a news report with subtitles is performed, it is preferred that the subtitles are broadcasted simultaneously with the report. In such a case, it is only necessary that a candidate of a correct term is obtained as a term for report to be output (broadcasted as a subtitle of the news).

This description also provides a computer-readable program for causing the computer to function as the above-described voice recognition system and an information recording medium (such as CD-ROM) storing the program.

The program causes the computer to function as the system that includes:

voice receiving means that receives a voice;
voice analysis means that performs a voice analysis on the voice received by the voice receiving means to obtain an analyzed term;
incorrectly converted term determining means that determines whether the analyzed term matches any of incorrectly converted terms stored in an incorrect conversion dictionary; and
corrected-term-candidate extraction means that obtains an input term corresponding to the matching incorrectly converted term as a candidate of a correct term when the incorrectly converted term determining means determines that the analyzed term matches any of the incorrectly converted terms stored in the incorrect conversion dictionary.

The incorrect conversion dictionary is updated by, for example, the program previously described.

INDUSTRIAL APPLICABILITY

Since this invention is used for a voice recognition system, it can be used in information industry.

DESCRIPTION OF REFERENCE SIGNS

1 Incorrect conversion dictionary generating system
3 Term input unit
5 Voice data conversion unit
7 Voice data analysis unit
9 Incorrectly converted term determining unit
11 Incorrect conversion dictionary

The invention claimed is:

1. An incorrect conversion dictionary generating system implemented by a computer and software, said software making a processor in the computer:
    receiving an input term in a written format;
    storing the written format input term in a memory;
    converting the written format input term to an input-term voice, which is a sound corresponding to the input term;
    outputting the input-term voice by a speaker,
    receiving by a microphone the input-term voice from the speaker,
    performing a voice analysis to convert the received input-term voice from the microphone to a voice-analyzed term in a written format,
    storing the written format voice-analyzed term in the memory;
    determining whether the written format input term and the written format voice-analyzed term are the same or not;
    when the written format input term and the written format voice-analyzed term are not the same, storing the written format voice-analyzed term as an incorrectly converted term of the written format input term to obtain or update an incorrect conversion dictionary.

2. The incorrect conversion dictionary generating system according to claim 1, wherein said software further making the processor
    receiving an electronic file; and
    extracting the input term included in the electronic file.

3. The incorrect conversion dictionary generating system according to claim 1, wherein in performing a voice analysis, the sound of input-term voice is once converted into electric data including frequency information and then converted into the written format voice-analyzed term.

4. A voice recognition system including the incorrect conversion dictionary generated by the incorrect conversion dictionary generating system according to claim 1, the software making a processor in the voice recognition system:
    receiving a voice;
    performing a voice analysis on the voice to obtain an analyzed term;
    determining whether the analyzed term matches any of incorrectly converted terms stored in the incorrect conversion dictionary; and
    obtaining a candidate of a correct term when the analyzed term matches any of the incorrectly converted terms.

* * * * *